No. 667,043. Patented Jan. 29, 1901.
J. STEEP.
SEED DRILL.
(Application filed Sept. 13, 1900.)
(No Model.)
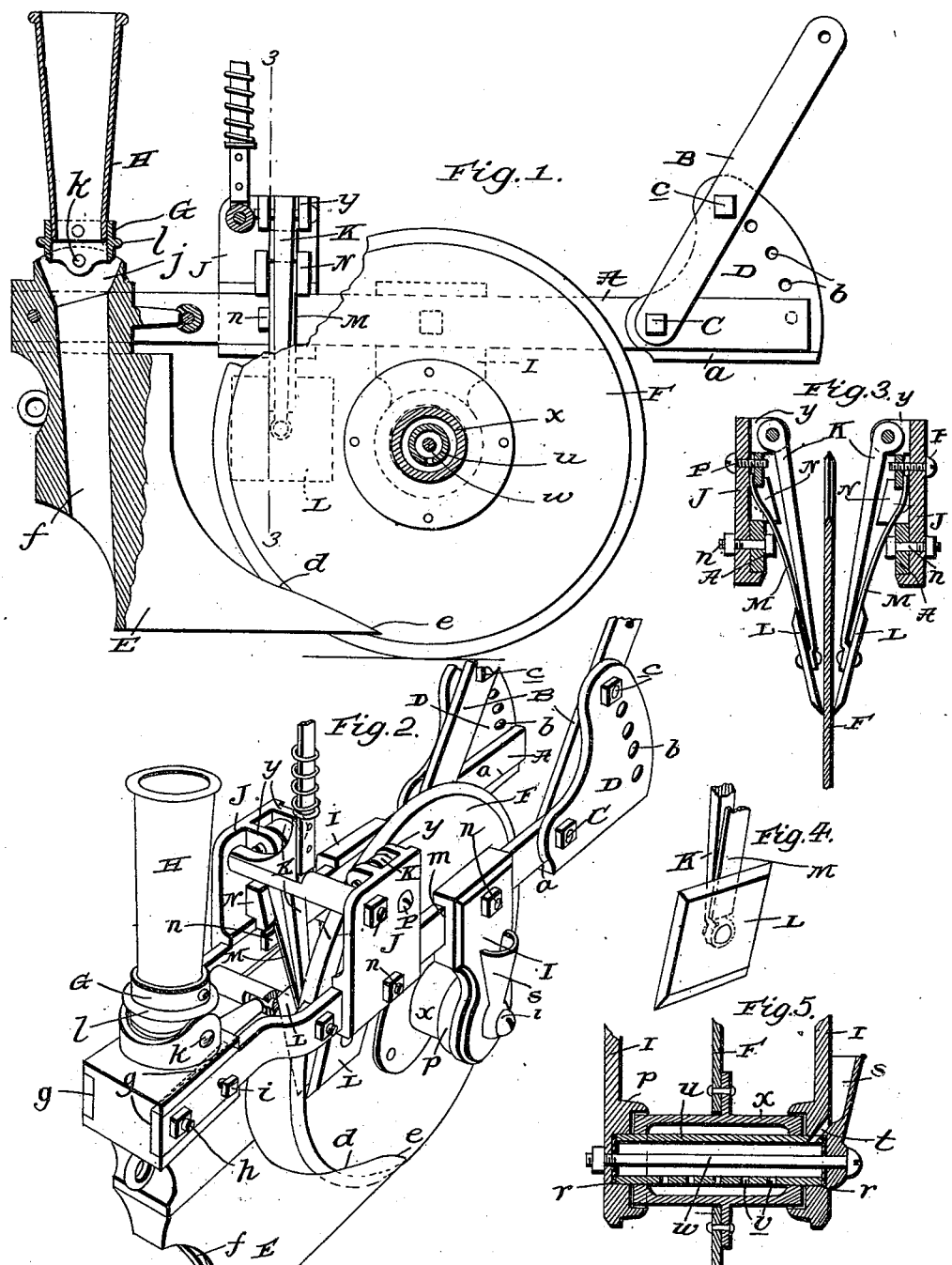

UNITED STATES PATENT OFFICE.

JAMES STEEP, OF CLINTON, CANADA.

SEED-DRILL.

SPECIFICATION forming part of Letters Patent No. 667,043, dated January 29, 1901.

Application filed September 13, 1900. Serial No. 29,914. (No model.)

*To all whom it may concern:*

Be it known that I, JAMES STEEP, a subject of the Queen of Great Britain, residing at Clinton, in the county of Huron, Province of Ontario, and Dominion of Canada, have invented new and useful Improvements in Seed-Drills, of which the following is a specification.

My invention relates to improvements in that class of seed-drills which comprise rolling colters arranged to operate in conjunction with shares.

It contemplates the provision of a seed-drill in which the colter is arranged to cut below the seed-bed, which makes a subsoiler, and also seeks, first, to provide for an even and continuous deposit of seed in a furrow cut by the colter in any kind or condition of soil without clogging by weeds or other rubbish or soil; second, to afford means for the proper adjustment of the point of the share to the colter, so as to take up slack and wear; third, to so arrange the boot through which the seed passes into the hollow share that said boot is enabled to rock and permit the rubber tube through which the seed passes into the boot to work up and down without being bent, broken, or thrown off when the drill is passing over rough ground; fourth, to adapt the drill to be operated by the heel of the share without the use of the colter, and, fifth, to provide means whereby the colter-bearings are continuously and thoroughly lubricated without waste of lubricant.

Other advantageous features of the invention will be fully understood from the following description and claims, when taken in connection with the accompanying drawings, in which—

Figure 1 is a side elevation, with parts in section, of so much of a seed-drill as is necessary to illustrate my invention. Fig. 2 is a perspective view of the same. Fig. 3 is a detail transverse section taken in the plane indicated by the broken line 3 3 of Fig. 1. Fig. 4 is a detail perspective view of one of the scrapers for clearing the colter. Fig. 5 is a detail diametrical section illustrative of the bearings of the colter.

In the said drawings similar letters of reference designate corresponding parts in all of the several views, referring to which—

A A are drag-bars which form the framework of my improvements, and B B are bars pivotally connected to the bars A through the medium of transverse bolts C. The said bolts also serve for the connection of hinge-plates D, which have flanges $a$ arranged to bear against the lower edges of the bars A and also have a plurality of apertures $b$ for the passage of bolts $c$, through the medium of which the plates are directly connected to the bars B. By virtue of the provision of the hinge-plates and the plurality of apertures therein the colter, presently described, may be raised and the heel of the share, presently described, may be thrown downwardly, so as to permit of the machine being operated by the said heel of the share alone, the colter when raised, as stated, being held above the surface of the soil, and consequently rendered idle.

E is the share, which is of steel or other suitable metal and has the forward sharp edge $d$ and point $e$ and also has its rear portion made hollow, as indicated by $f$, to afford a passage for seeds. The said share is provided in its opposite side and adjacent to its upper end with two longitudinal grooves $g$ to receive the rear ends of the frame-bars A, to which it is connected by a transverse bolt $h$, as shown. The grooves $g$ in the share E are gradually increased in depth toward their forward ends, and the frame-bars A are provided with set-screws $i$, which bear at their inner ends against the share E. Through the medium of the said set-screws the share E may be accurately adjusted with respect to the surface of the colter F to compensate for wear of the meeting surfaces of the share and colter, which will be appreciated as an important advantage when it is considered that the proper operation of my improvements depends upon keeping the point of the share in close contact with the rotary colter. The arrangement of the frame-bars A in the grooves $g$ of share E is also advantageous, because it results in the share E being held horizontally in proper relation to the colter F—that is to say, with its point above the lowest point in the circumference of the colter, which is desirable, since it adapts the colter to cut below the seed-bed and makes a subsoiler.

The passage $f$ in share E is preferably flared at its upper end, as indicated by $j$, to receive a collar G, which is pivotally connected at $k$ to the share, and has an exterior flange $l$, which bears upon the beveled or curved upper end of the share, as shown. The said collar G receives and is connected to the lower end of a boot H, of sheet metal or other suitable material, and is free to rock fore and aft on the share and permit the boot H to have the same movement. By virtue of this the usual rubber tube through which the seed passes into the boot is free to work up and down without bending sharply, breaking, or being thrown off incident to the passage of the drill over rough ground.

I I are hangers, which are grooved, as indicated by $m$, to receive the frame-bars A and are connected to said frame-bars by transverse bolts $n$. These hangers I are provided at their lower ends with inwardly-directed circular flanges $p$ and within said flanges and at the center of the circles described with circular seats $r$. One of the hangers is also provided with an oil-cup $s$, between which and one of the circular seats $r$ is a passage $t$ for oil or other suitable lubricant. In the seats $r$ of the hangers are arranged the ends of a tube $u$, which is provided with an aperture coincident with the passage $t$ and also with apertures $v$ at intermediate points of its length and is secured in position by a transverse bolt $w$, which passes through the hangers and tube $u$ and is suitably packed at the hangers to preclude leakage and waste of lubricant. Mounted on the tube $u$ is the hub $x$ of the colter F. This hub has its ends arranged within the flanges $p$ of the hangers I and is hollow, as best shown in Fig. 5, so that it bears at its ends alone on the tube $u$.

By virtue of the construction above described it will be seen that when the cup or reservoir $s$ is charged with lubricant the lubricant will be distributed throughout the bearing of the colter and retained therein; also, that the colter, while free to rotate, is securely held against casual lateral movement or deflection.

J J are standards connected to and rising from the frame-bars A. These standards are provided at their upper ends with inwardly-directed apertured lugs $y$, to which are pivotally connected depending arms K. At their lower ends the said arms K are provided with scrapers L, which are pivotally connected thereto by rivets or other suitable means. The said scrapers are preferably rectangular in form and have four sharp edges designed to engage the colter F, whereby it will be seen that when one of their edges is dulled or worn it is simply necessary to turn them, so as to present another one of their edges to the side of the colter. The scrapers L are held under pressure against the sides of the colter by springs M, which have their lower ends interposed between the arms K and the scrapers, while their upper portions are passed between and held against lateral movement by lugs N on the standards J and are connected to said standards by suitable bolts P after the manner best illustrated in Fig. 3. It will be seen that the scrapers held under pressure against the sides of the colter in the manner described will effectually prevent soil, weeds, or other rubbish from clogging the drill.

It will be appreciated from the foregoing that notwithstanding its advantages the present embodiment of my invention is simple and inexpensive and is desirable for such reasons. I do not desire, however, to be understood as confining myself to the specific construction and relative arrangement of the parts embraced in such embodiment of the invention, as such changes or modifications may be made in practice as fairly fall within the scope of my claims. It will also be appreciated that my improved drill is calculated to deliver a continuous and even stream of seed in a narrow furrow from three to five inches deep in any kind of soil, and this without liability of the seed being scattered by jolting of the machine or exposure to the wind.

Having described my invention, what I claim, and desire to secure by Letters Patent, is—

1. In a seed-drill, the combination of the sharp-edged rolling colter, and the pointed, sharp-edged share overlapping the colter, arranged in a plane above the lowermost point thereof, and adjustably connected with the frame of the drill whereby it may be retained in the proper relative position to the colter, substantially as specified.

2. In a seed-drill, the combination of the sharp-edged, rolling colter, and the pointed, sharp-edged share overlapping the rolling colter and adjustably connected with the frame of the drill whereby it may be retained in the proper relative position to the colter, substantially as and for the purpose set forth.

3. In a seed-drill, the combination of a rolling colter, and a scraper therefor; the said scraper having a plurality of scraping edges and being mounted and adapted to turn upon a suitable support whereby any one of its edges may be presented to the colter, substantially as specified.

4. In a seed-drill, the combination of a frame, a rolling colter mounted therein, a share also mounted in the frame in rear of the colter and arranged in a plane above the lowermost point thereof, one or more bars B, and suitable means for adjustably fixing the frame with respect to the bar or bars B, substantially as and for the purpose set forth.

5. In a seed-drill, the combination of a frame, hangers connected thereto and having inwardly-directed circular flanges, and also having circular seats within the flanges, a lubricant-reservoir arranged on one of the hangers, a passage leading from said reservoir to one of the seats, a tube having its ends arranged in the seats of the hangers, and also having an aperture coincident with the lubricant-passage, and one or more apertures at an intermediate point of its length, a bolt extending through and connecting the hangers and tube, and a colter having a hollow hub surrounding the tube and bearing at its ends on said tube and in the flanges of the hangers, substantially as and for the purpose set forth.

6. In a seed-drill, the combination of a frame, a rolling colter mounted therein, an arm pivotally connected to and depending from the frame, a scraper of rectangular or other suitable form mounted and adapted to turn upon the arm and having a plurality of scraping edges, and a spring connected to the frame for pressing the arm and scraper thereon toward the colter.

7. In a seed-drill, the combination of a hollow share having its upper end rounded or beveled, a collar arranged in and connected in a pivotal manner to the share and having an exterior flange bearing on the upper end thereof whereby it is adapted to rock on and with respect to said share, and a boot carried by the collar whereby it is adapted to rock with the same, substantially as specified.

8. In a seed-drill, the combination of the frame-bars A, the rolling colter mounted in bearings connected therewith, the share having the point overlapping the rolling colter and also having grooves in its sides receiving the frame-bars, a suitable connection between the frame-bars and share, and adjusting-screws bearing in the frame-bars and engaging the share, substantially as specified.

9. In a seed-drill, the combination of the frame-bars A, the rolling colter mounted in bearings connected therewith, the share mounted in the frame-bars A in rear of the rolling colter and having the flat under side arranged in a plane above the lowermost point of the colter, the bars B, the hinge-plates having flanges arranged below the frame-bars A, and also having a circular series of apertures, bolts extending through and connecting the frame-bars A, the bars B and the hinge-plates, and other bolts extending through and connecting the hinge-plates directly to the bars B, substantially as specified.

In testimony whereof I have hereunto set my hand in presence of two subscribing witnesses.

JAMES STEEP.

Witnesses:
H. B. GUEST,
FRED W. DOTY.